US012640671B2

(12) United States Patent
Ji et al.

(10) Patent No.: US 12,640,671 B2
(45) Date of Patent: May 26, 2026

(54) METHOD AND SYSTEM FOR SIMULTANEOUSLY REALIZING CURRENT SAMPLING GAIN AND DELAY COMPENSATION

(71) Applicant: HANGZHOU CITY UNIVERSITY, Hangzhou (CN)

(72) Inventors: Feifan Ji, Hangzhou (CN); Yanjun Li, Hangzhou (CN); Qingyu Song, Hangzhou (CN)

(73) Assignee: HANGZHOU CITY UNIVERSITY, Hangzhou (CN)

( * ) Notice: Subject to any disclaimer, the term of this patent is extended or adjusted under 35 U.S.C. 154(b) by 158 days.

(21) Appl. No.: 18/419,379

(22) Filed: Jan. 22, 2024

(65) Prior Publication Data

US 2024/0305229 A1      Sep. 12, 2024

Related U.S. Application Data

(63) Continuation of application No. PCT/CN2023/081512, filed on Mar. 15, 2023.

(30) Foreign Application Priority Data

Mar. 6, 2023    (CN) .......................... 202310204773.0

(51) Int. Cl.
H02P 21/14         (2016.01)
H02P 21/22         (2016.01)
H02P 27/08         (2006.01)

(52) U.S. Cl.
CPC .............. H02P 21/14 (2013.01); H02P 21/22 (2016.02); H02P 27/08 (2013.01); *H02P 2207/05* (2013.01)

(58) Field of Classification Search
CPC .......... H02P 21/22; H02P 27/08; H02P 21/14; H02P 2207/05
See application file for complete search history.

(56) References Cited

U.S. PATENT DOCUMENTS 7,723,944 B2 *   5/2010   Kitanaka ................. H02P 21/06
                                                         318/807
8,269,441 B2 *   9/2012   Morimoto ........... H02P 21/0089
                                                         318/400.14

(Continued)

FOREIGN PATENT DOCUMENTS

CN          107086834 A      8/2017
CN          107509393 A      12/2017

(Continued)

OTHER PUBLICATIONS

International Search Report (PCT/CN2023/081512); Date of Mailing: Jun. 23, 2023.

(Continued)

*Primary Examiner* — Thai T Dinh
(74) *Attorney, Agent, or Firm* — Wiersch Law Group

(57)                    ABSTRACT

A method and a system for simultaneously realizing current sampling gain and delay compensation. A dummy load is formed from three-phase inductors with star connection to replace a motor load, and a dummy rotation angle is generated by software. In a calibration mode, a standard current sampling element is used for current sampling, and the related calibration parameters in the stable state are stored. Then, in a regulation mode, other current sampling elements produced in batches are used for current sampling, and the delay compensation coefficient and gain compensation coefficient of the sampled current are generated through two closed-loop voltage feedbacks respectively, and the two compensation processes are decoupled from each other and (Continued)

do not affect each other. The present disclosure effectively ensures the accuracy and consistency of current sampling.

10 Claims, 3 Drawing Sheets

(56)                References Cited

U.S. PATENT DOCUMENTS

| | | | | |
|---|---|---|---|---|
| 8,390,223 | B2 * | 3/2013 | Nakamura | H02P 21/06 |
| | | | | 318/432 |
| 9,077,278 | B2 * | 7/2015 | Omata | H02P 21/22 |
| 9,203,335 | B2 * | 12/2015 | Shoji | H02P 21/0085 |
| 2004/0206571 | A1 | 10/2004 | Nishizaki et al. | |
| 2014/0042938 | A1 * | 2/2014 | Shoji | H02P 21/0089 |
| | | | | 318/400.02 |
| 2019/0131910 | A1 * | 5/2019 | Ue | H02P 21/09 |
| 2019/0393817 | A1 * | 12/2019 | Eguchi | H02P 21/22 |
| 2020/0382032 | A1 * | 12/2020 | Takase | H02P 21/05 |
| 2021/0214000 | A1 * | 7/2021 | Miki | H02P 21/06 |
| 2021/0384855 | A1 | 12/2021 | Chen et al. | |

FOREIGN PATENT DOCUMENTS

| | | | |
|---|---|---|---|
| CN | 108712125 | A | 10/2018 |
| CN | 110417308 | A | 11/2019 |
| CN | 112398400 | A | 2/2021 |
| CN | 113422550 | A | 9/2021 |
| CN | 113691186 | A | 11/2021 |
| CN | 113726248 | A | 11/2021 |
| CN | 113783489 | A | 12/2021 |
| JP | 2008161027 | A | 7/2008 |

OTHER PUBLICATIONS

First Office Action(CN202310204773.0); Date of Mailing: May 10, 2023.

Notice Of Allowance(CN202310204773.0); Date of Mailing: May 23, 2023.

Time-Delay-Compensation-About-AC-Drive-Vector-Control-System; Date of Mailing: May 31, 2011.

Digital-Implementation-of-Single-Current-Sensor-Based-IPMSM-Drive-With-Sampling-Error-Delay-Compensation; Date of Mailing: Nov. 1, 2015.

* cited by examiner

METHOD AND SYSTEM FOR SIMULTANEOUSLY REALIZING CURRENT SAMPLING GAIN AND DELAY COMPENSATION

CROSS-REFERENCE TO RELATED APPLICATIONS

The present application is a continuation of International Application No. PCT/CN2023/081512, filed on Mar. 15, 2023, which claims priority to Chinese Application No. 202310204773.0, filed on Mar. 6, 2023, the contents of both of which are incorporated herein by reference in their entireties.

TECHNICAL FIELD

The present disclosure relates to a compensation method and system for a three-phase current sensor, in particular to a method and system for simultaneously realizing current sampling gain and delay compensation, by which current adjustment gain parameters of the three-phase current sensor can be obtained.

BACKGROUND

A permanent magnet synchronous motor (PMSM) has great advantages over other motors in reliability, power density and efficiency cost. At the same time, PMSM has become one of the key components of electric vehicles with the continuous iterative update of power electronics technology. Vector control, one of the commonly used control methods of permanent magnet synchronous motor, has the main idea: an alternating current in a three-phase stationary coordinate system is decoupled by coordinate transformation and decomposed into a quadrature axis current and a direct axis current in a two-phase rotating coordinate system, and then the quadrature axis current and the direct axis current is controlled, respectively. With the help of inverter, the permanent magnet synchronous motor can be controlled as a DC motor, which has good dynamic performance.

The control algorithm is implemented in a discrete digital system. Since the A/D conversion process, hardware filtering process and current sensor signal conversion process are inevitable, the sampling current has a certain phase delay compared with the actual current, thereby affecting the actual accuracy of the sampling current. In addition, the three-phase current sensor assembled in the batch-produced electrically driven integrated controller has a certain gain deviation in use, and needs to be fine-tuned to reduce the influence thereof on the sampling accuracy in actual work. The current sampling accuracy directly affects the stability, control accuracy and efficiency of permanent magnet synchronous motor, especially in a high-speed operation range. Therefore, it is necessary to compensate and correct the sampling delay and gain of the three-phase current sensor during the batch-production process of the electrically driven integrated controller. In the prior art, the following methods are usually adopted:

1) Fine-tuning of current sampling gain: usually, a current command with a specified amplitude is sent to the motor, and the actual sampling gain is fine-tuned by detecting an actual feedback current command amplitude and comparing it with the specified amplitude.

2) Compensation for current sampling delay: high-frequency injection method.

A permanent magnet synchronous motor load is directly loaded, and a classical current loop closed loop is adopted as the basic control architecture. A high-frequency voltage signal is injected into the d-axis to obtain a high-frequency current signal expression, and the high-frequency current sampling signal expression is modified by considering the delay time of phase current sampling, and the phase delay of current sampling is extracted by using a phase-locked loop. The control structure diagram is shown in FIG. 1.

According to literature search, except for high frequency injection, many other current sampling delay compensation strategies adopt direct loading of a permanent magnet synchronous motor load for calibration experiments, which will consume a lot of power cost, time cost, bench loss cost and space cost in the process of large-scale production process of electrically driven integrated controllers.

SUMMARY

The present disclosure aims to provide a method and a system for simultaneously realizing current sampling gain and delay compensation. In the present disclosure, a dummy load is formed from three-phase inductors with star connection to replace a motor load, and a dummy rotation angle is generated by software. In a calibration mode, a standard current sampling element is used for current sampling, and the related calibration parameters in the stable state are stored. Then, in a regulation mode, other current sampling elements produced in batches are used for current sampling, and the delay compensation coefficient and gain compensation coefficient of the sampled current are generated through two closed-loop voltage feedbacks, respectively, and the two compensation processes are decoupled from each other and do not affect each other. The present disclosure effectively ensures the accuracy and consistency of current sampling.

The technical solution adopted by the present disclosure is as follows:

The present disclosure relates to a method for simultaneously realizing current sampling gain and delay compensation, including the calibration mode and the regulation mode executed in sequence.

In the calibration mode, a reference direct-axis and quadrature-axis current and a three-phase drive voltage in a synchronous rotating coordinate system are calculated and generated based on a virtual angle of a given frequency, and an amplitude and an angle of a given current command. In an embodiment, the virtual angle of the given frequency, and the amplitude and angle of the given current command are obtained, and the reference direct-axis and quadrature-axis current in the synchronous rotating coordinate system is calculated and generated. A deviation between the reference direct-axis and quadrature-axis current and a feedback direct-axis and quadrature-axis current signal is detected, the d-axis control voltage and the q-axis control voltage are output, respectively, and a three-phase drive voltage is generated by combining the virtual angle.

The three-phase drive voltage drives a dummy load module to generate a three-phase current; the three-phase current sensor samples and detects the three-phase current generated by the dummy load module in real time, mathematically converts the three-phase current with the virtual angle, generates and outputs the feedback direct-axis and quadrature-axis current signal in the synchronous rotating coordinate system to form feedback for real-time adjustment, detects the output d-axis control voltage $v_d$ and the q-axis control voltage $v_q$ when in a stable state, extracts the d-axis control voltage $v_d$ in the stable state as a calibrated d-axis voltage, and calculates the calibrated voltage amplitude.

The dummy load module consists of three-phase symmetrical inductor with star connection.

In the regulation mode, the reference direct-axis and quadrature-axis current and the three-phase drive voltage in the synchronous rotating coordinate system are calculated and generated based on an actual virtual angle, and an amplitude and an angle of an actual current command. In an embodiment, the actual virtual angle, and the amplitude and angle of the actual current command are obtained, and the reference direct-axis and quadrature-axis current in the synchronous rotating coordinate system is calculated and generated; and a deviation between the reference direct-axis and quadrature-axis current and the feedback direct-axis and quadrature-axis current signal is detected, the d-axis control voltage and the q-axis control voltage are output, respectively, and the three-phase drive voltage is generated by combining the virtual angle.

The three-phase drive voltage drives the dummy load module to generate the three-phase current.

The three-phase current sensor to be compensated samples and detects the three-phase current generated by the dummy load module in real time, and generates and outputs the feedback direct-axis and quadrature-axis current signal in the synchronous rotating coordinate system to form feedback for real-time adjustment.

When in the stable state, a current adjustment gain parameter $K_{comp}$ and a sampling delay compensation angle $\theta_{comp}$ are stored to complete the current sampling gain and delay compensation of the three-phase current sensor to be compensated of current.

The actual virtual angle $\theta_{eadj}$ and the amplitude $I_{sadj}$ of the actual current command are obtained through real-time feedback compensation by the following method:

$$I_{sadj} = I_{scali} - I_{scomp}$$

$$\theta_{eadj} = \theta_e + \theta_{comp}$$

where $I_{scali}$ is the amplitude of the given current command, and $I_{scomp}$ is a current command amplitude compensation obtained based on a deviation between a calibrated voltage amplitude obtained in the calibration mode and a voltage amplitude calculated by a voltage detection and calculator in real time; and $\theta_e$ is the virtual angle of the given frequency, and $\theta_{comp}$ is a virtual angle compensation obtained based on a deviation between the calibrated d-axis voltage obtained in the calibration mode and a d-axis voltage detected by the voltage detection and calculator in real time.

Further, the calibrated voltage amplitude $u_{scali}$ is calculated as follows:

$$u_{scali} = \sqrt{v_d^2 + v_q^2}$$

where $v_d$ is a d-axis control voltage and $v_q$ is a q-axis voltage amplitude.

Further, the current adjustment gain parameter $K_{comp}$ is as follows:

$$K_{comp} = \frac{I_{sadj}}{I_{scali}}.$$

A system for simultaneously realizing current sampling gain and delay compensation for implementing the above method for simultaneously realizing current sampling gain and delay compensation, including:

A current command generation module is configured to calculate and generate the reference direct-axis and quadrature-axis current in the synchronous rotating coordinate system based on the amplitude and the angle of a given current command.

A virtual angle generation module is configured to generate the virtual angle of the given frequency.

A dummy load module includes the three-phase symmetrical inductor with star connection, and the three-phase symmetrical inductor is driven by the three-phase drive voltage to generate the three-phase current.

A current detection module includes the three-phase current sensor, and the three-phase current sensor is configured to detect the three-phase current generated by the dummy load module.

A three-phase drive voltage generation module is configured to generate the three-phase drive voltage.

A sampling delay and gain compensation module is configured to store a current adjustment gain parameter $K_{comp}$ and a sampling delay compensation $\theta_{comp}$ to complete the current sampling gain and delay compensation of the three-phase current sensor to be compensated of the current in the regulation mode.

Further, the system further includes a parameter storage module for storing the calibrated voltage amplitude and the calibration d-axis voltage.

Further, the current detection module further includes a Clark-Park converter, which is used to mathematically convert the three-phase current with the virtual angle generated by the virtual angle generation module, and output a feedback direct-axis and quadrature-axis current signal in the synchronous rotating coordinate system.

Further, the three-phase drive voltage generation module comprises: a voltage control module configured to detect a deviation between the reference direct-axis and quadrature-axis current generated by the current command generation module and the feedback direct-axis and quadrature-axis current signal, and outputting a d-axis control voltage and a q-axis control voltage, respectively; and an inverter drive module configured to receive the d-axis control voltage and q-axis control voltage output by the voltage control module and the virtual angle output by the virtual angle generation module to generate the three-phase drive voltage.

Further, the voltage control module comprises a q-axis voltage controller and a d-axis voltage controller. The q-axis voltage controller is configured for detecting a deviation between a q-axis reference current $i_{qref}$ generated by the current command generation module and a q-axis feedback current $i_q$ output by the current detection module, and outputting a q-axis control voltage $v_q$ through a q-axis voltage regulator; and the d-axis voltage controller is configured for detecting a deviation between a d-axis reference current $i_{dref}$ generated by the current command generation module and a d-axis feedback current id output by the current detection module, and outputting a d-axis control voltage $v_d$ through a d-axis voltage regulator.

Further, the inverter drive module includes an inverse Park converter, a Space Vector Pulse-Width-Modulation (SVPWM) modulator and an inverter.

The inverse Park converter is configured for receiving the d-axis control voltage $v_d$ and the q-axis control voltage $v_q$ output by the voltage control module and the virtual angle $\theta_e$ output by the virtual angle generation module for inverse Park mathematical conversion to generate voltages $v_\alpha$ and $v_\beta$ in a two-phase stationary coordinate system.

The SVPWM modulator is configured for receiving the voltages $v_\alpha$ and $v_\beta$ in the two-phase stationary coordinate system for space vector pulse width modulation, and generating impulse waves.

The inverter is configured to generate the three-phase drive voltage based on the impulse waves.

Further, the three-phase current sensor adopts a standard current sampling element in a calibration mode.

Further, the sampling delay and gain compensation module comprises a voltage detection and calculator, a current amplitude regulator and a delay compensation regulator. The voltage detection and calculator is configured for detecting the d-axis control voltage and the q-axis control voltage output from the voltage control module in real time. The current amplitude regulator is configured for obtaining a current command amplitude compensation based on a deviation between a calibrated voltage amplitude and a voltage amplitude calculated by the voltage detection and calculator in real time. And the delay compensation regulator is configured for obtaining a virtual angle compensation based on a deviation between a calibrated d-axis voltage and a d-axis voltage detected by the voltage detection and calculator in real time.

Further, that output channel of the current amplitude regulator and the delay compensation regulator in the sampling delay and gain compensation module are closed in the calibration mode.

The present disclosure has the beneficial effects that a dummy load is formed from three-phase inductors by star connection, the virtual rotation angle is generated by software, and the compensation of current sampling is realized through improvement based on the traditional current loop control architecture; since the inductive load does not generate active power, the power cost is greatly saved, the space cost is saved in small load volume, the dynamic response is faster, and the time cost is saved; the loss of the platform is reduced by not directly pulling the motor load; at the same time, compared with the above-mentioned methods, this method not only considers the sampling delay factor in the current sampling process, but further considers the influence of sampling gain deviation on sampling accuracy, and obtains the gain compensation coefficient and delay compensation coefficient simultaneously by means of double closed-loop adjustment.

DESCRIPTION OF EMBODIMENTS

Figure 1:
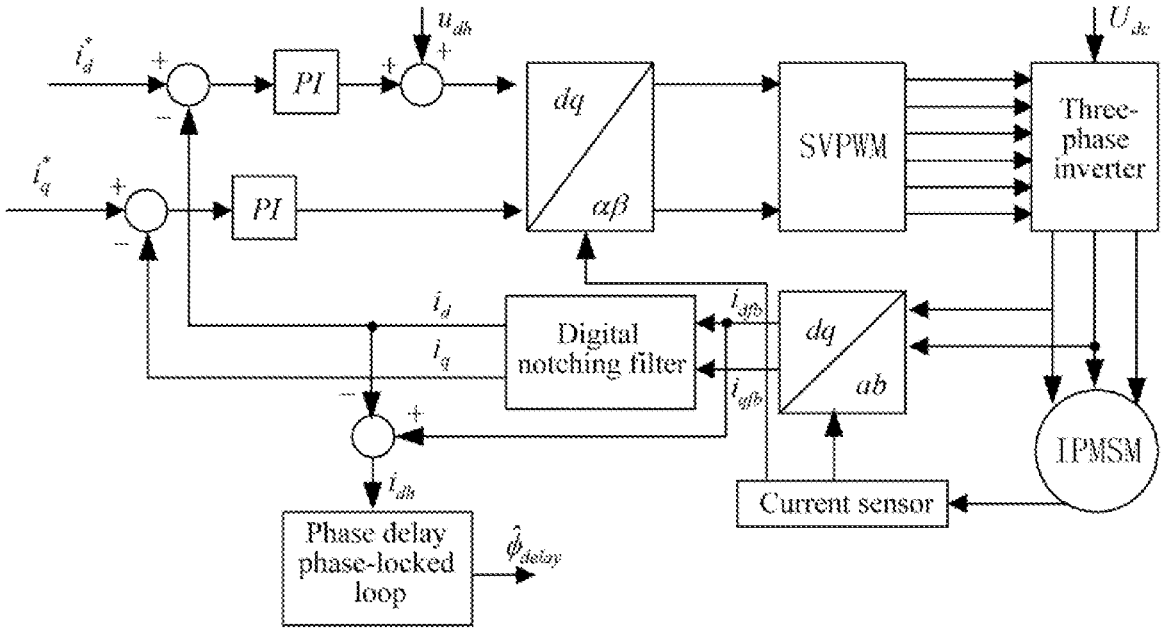
FIG. 1 is a control structure diagram of current sampling delay compensation in the prior art.

The present disclosure will be further described in detail with the attached drawings and specific embodiments:

The present disclosure provides a method for simultaneously realizing current sampling gain and delay compensation, which includes a calibration mode and a regulation mode which are executed in sequence, that calibration mode specifically includes the follow steps:

The reference direct-axis and quadrature-axis current and the three-phase drive voltage in the synchronous rotating coordinate system are calculated and generated based on the virtual angle of the given frequency, the amplitude and the angle of the given current command; the deviation between the reference direct-axis and quadrature-axis current and the feedback direct-axis and quadrature-axis current signal is detected, the d-axis control voltage and the q-axis control voltage are output, respectively, and the three-phase drive voltage is generated by combining the virtual angle; the three-phase drive voltage drives the dummy load module to generate the three-phase current; the three-phase current sensor samples and detects the three-phase current generated by the dummy load module in real time, mathematically converts the three-phase current with the virtual angle, generates and outputs the feedback direct-axis and quadrature-axis current signal in the synchronous rotating coordinate system to form feedback for real-time adjustment, detects the output d-axis control voltage $v_d$ and q-axis control voltage $v_q$ when in the stable state, extracts the d-axis control voltage $v_d$ in the stable state as the calibrated d-axis voltage, and calculates the calibrated voltage amplitude.

The dummy load module consists of three-phase symmetrical inductors with star connection.

The regulation mode is specifically as follows: the reference direct-axis and quadrature-axis current and the three-phase drive voltage in the synchronous rotating coordinate system are calculated and generated based on the actual virtual angle, and the amplitude and the angle of the actual current command; the actual virtual angle $\theta_{eadj}$ and the actual current command amplitude $I_{sadj}$ are obtained through real-time feedback compensation, and the compensated current value $I_{scomp}$ is obtained based on the deviation between the calibrated voltage amplitude obtained in the calibration mode and the voltage amplitude calculated by the voltage detection and calculator in real time; and the compensated virtual $\theta_{comp}$ is obtained based on the deviation between the calibrated d-axis voltage obtained in the calibration mode and the d-axis voltage detected by the voltage detection and calculator in real time.

Then, the deviation between the reference direct-axis and quadrature-axis current and the feedback direct-axis and quadrature-axis current signal is detected, and the d-axis control voltage and q-axis control voltage are output, respectively; the three-phase drive voltage is generated by combining the virtual angle; the three-phase drive voltage drives the dummy load module to generate the three-phase current; the three-phase current sensor samples and detects the three-phase current generated by the dummy load module in real time, performs mathematical conversion between the three-phase current and the virtual angle, and outputs the feedback direct-axis and quadrature-axis current signal in the synchronous rotating coordinate system to form feedback for real-time adjustment.

The current adjustment gain parameter $K_{comp}$ and the sampling delay compensation angle $\theta_{comp}$ are stored to complete the current sampling gain and delay compensation of the three-phase current sensor when in a stable state.

Figure 2:
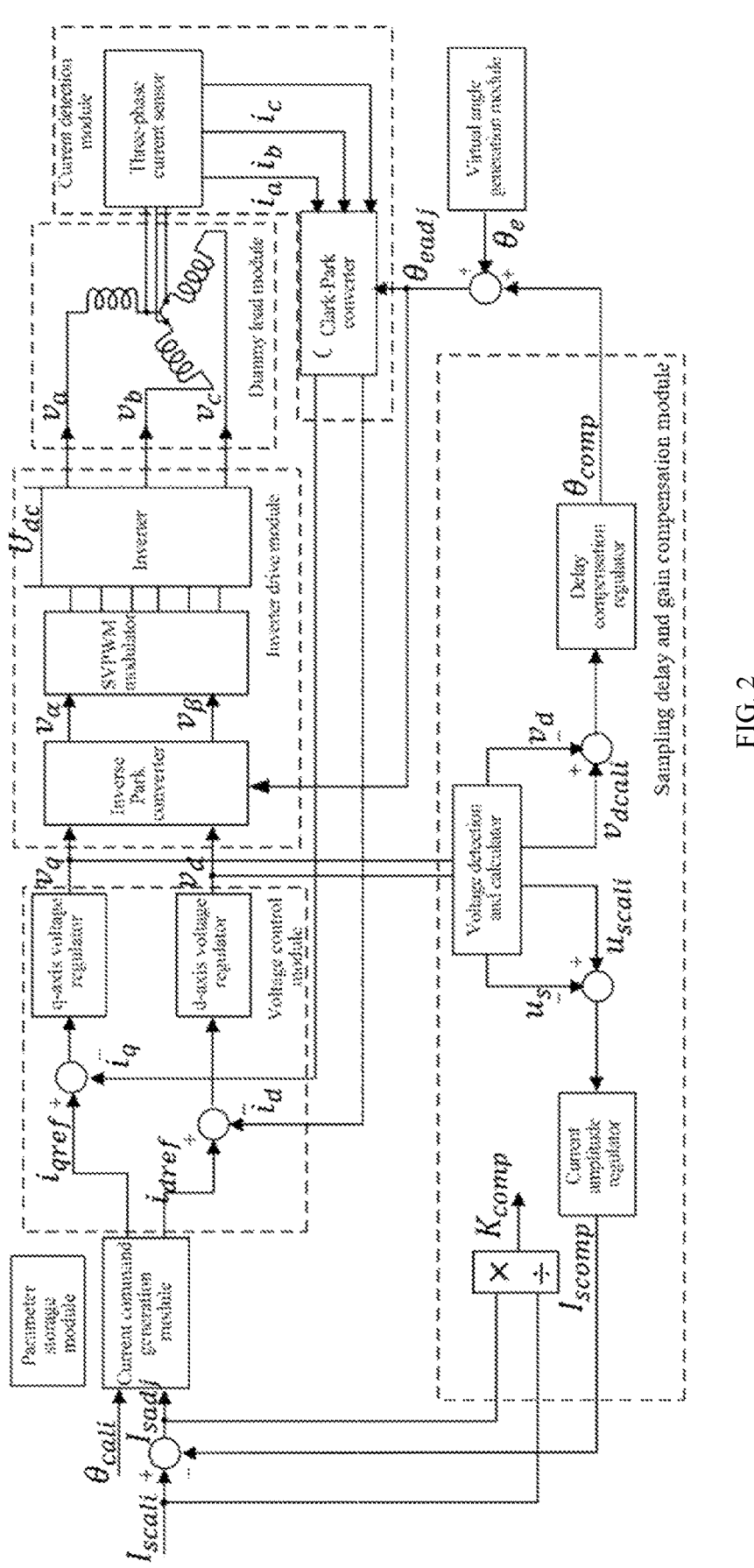
FIG. 2 is a control structure diagram of a method for simultaneously realizing current sampling gain and delay compensation in the present disclosure.
Figure 3:
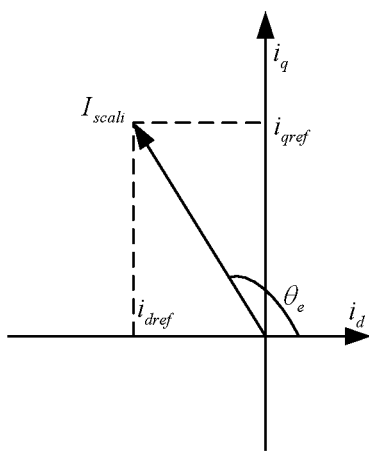
FIG. 3 is a current command in the synchronous rotating coordinate system of the present disclosure.

FIG. 2 is a control structure diagram of the method for simultaneously realizing current sampling gain and delay compensation, which is based on the implementation of a system for simultaneously realizing current sampling gain and delay compensation. The system mainly include the parameter storage module, the current command generation module, the voltage control module, the inverter drive module, the dummy load module, the current detection module, the virtual angle generation module, and the sampling delay and gain compensation module. The voltage control module includes the q-axis voltage controller and the d-axis voltage controller; the inverter drive module includes the inverse Park converter, the SVPWM modulator and the inverter; the dummy load module includes a three-phase symmetrical inductor with star connection; the current detection module mainly includes the three-phase current sensor to be compensated and the Clark-Park converter; and the sampling delay and gain compensation module mainly includes the current amplitude regulator, the voltage detection and calculator and the delay compensation regulator.

Under this control structure, the following two working modes are executed in turn to complete the final sampling gain and delay compensation function:

I. Calibration Mode

In the calibration mode, the output channels of the current amplitude regulator and the delay compensation regulator in the sampling delay and gain compensation module are closed, and the standard current sampling element is used as a benchmark test element for subsequent operation.

Firstly, the parameter storage module sends out the amplitude $I_{scali}$ and the angle $\theta_{cali}$ of a given current command, and the amplitude $I_{scali}$ and the angle $\theta_{cali}$ of the given current command are calculated by the current command generation module according to the following formula to generate reference AC/DC axis currents $i_{dref}$ and $i_{qref}$ in the synchronous rotating coordinate system, which are expressed as follows:

$$i_{dref}=I_{scali} \cos \theta_{cali}$$

$$i_{qref}=I_{scali} \sin \theta_{cali}$$

The relationship of the above signals in the synchronous rotating coordinate system is shown in FIG. 2.

The virtual angle generation module generates the virtual angle $\theta_e$ of the given frequency f according to the following formula.

$$\theta_e=2\pi ft$$

where t is a sampling time.

The three-phase inductors in the dummy load module are driven by the PWM wave generated by the inverter drive module. The currents $i_a$, $i_b$ and $i_c$ in the three-phase inductor are detected by the three-phase current sensor in the current detection module, and are input to the Clark-Park converter together with the virtual angle $\theta_e$ generated by the virtual angle generation module for mathematical conversion, and the feedback direct-axis and quadrature-axis current signals $i_d$ and $i_q$ in the synchronous rotating coordinate system are output.

The q-axis voltage controller of the voltage control module detects the deviation between the q-axis reference current $i_{qref}$ generated by the current command generation module and the q-axis feedback current $i_q$ output by the current detection module, and outputs the q-axis control voltage $v_q$ through the q-axis voltage regulator, and the d-axis voltage controller detects the deviation between the d-axis reference current $i_{dref}$ generated by the current command generation module and the d-axis feedback current $i_d$, and outputs the d-axis control voltage $v_d$ through the d-axis voltage regulator.

In the inverter drive module, the inverse Park converter receives the d-axis control voltage $v_d$, the q-axis control voltage $v_q$ output by the voltage control module and the virtual angle $\theta_e$ output by the virtual angle generation module for inverse Park mathematical conversion to generate voltages $v_\alpha$ and $v_\beta$ in the two-phase stationary coordinate system, which are then input into the SVPWM regulator for space vector pulse width modulation. The generated impulse wave acts on the inverter to generate three-phase drive voltages $v_a$, $v_b$ and $v_c$, and the three-phase voltage acts on the three-phase symmetrical inductors to generate a three-phase current. Since the dummy load module is connected by inductive load, there is almost no active power consumption in the whole operation process.

When the system is in the steady state, the voltage detection and calculator in the sampling delay and gain compensation module detects the d-axis control voltage $v_d$ and q-axis control voltage $v_q$ output from the voltage control module, extracts the d-axis control voltage $v_d$ in the steady state as the calibrated d-axis voltage $v_{dcali}$, and calculates the calibrated voltage amplitude $u_{scali}$ according to the following formula.

$$u_{scali} = \sqrt{v_d^2 + v_q^2}$$

Finally, the calibrated d-axis voltage $v_{dcali}$ and the calibrated voltage amplitude $u_{scali}$ are sent to the parameter storage module for storage.

II. Regulation Mode

In the regulation mode, the output channels of the current amplitude regulator and the delay compensation regulator in the sampling delay and gain compensation module are opened, and the sampling gain and delay compensation are carried out for the three-phase current sensors in other electrically driven integrated controllers produced in the same batch, respectively. At this time, based on the calibration mode operation, the current amplitude regulator in the sampling delay and gain compensation module will output the current command amplitude compensation $I_{scomp}$, and the actual current amplitude $I_{sadj}$ sent into the corresponding current command generation module is:

$$I_{sadj} = I_{scali} - I_{scomp}$$

The delay compensation regulator in the sampling delay and gain compensation module will output the virtual angle compensation $\theta_{comp}$, and the actual virtual angle $\theta_{eadj}$ sent into Clark-Park converter and inverse Park converter is:

$$\theta_{eadj} = \theta_e + \theta_{comp}$$

In an embodiment, the current command amplitude compensation $I_{scomp}$ is generated by comparing the deviation between the calibrated voltage amplitude $u_{scali}$ stored in the parameter storage module in calibration mode and the voltage amplitude $u_s$ calculated by the voltage detection and calculator in real time and taking the deviation as the input of the current amplitude regulator. The virtual angle compensation $\theta_{comp}$ is generated by comparing the deviation between the calibrated d-axis voltage $v_{dcali}$ stored in the parameter storage module in the calibration mode and the actual d-axis voltage $v_d$ detected by the voltage detection and calculator and taking this deviation as the input of the delay compensation regulator. In the present disclosure, the current amplitude regulator and the delay compensation regulator adopt PI controllers.

After the system is in the stable state, the parameter storage module stores the current adjustment gain parameter $K_{comp}$ and the sampling delay compensation angle $\theta_{comp}$, where $K_{comp}$ meets the following requirements:

$$K_{comp} = \frac{I_{sadj}}{I_{scali}}$$

Finally, after the sampling gain and delay compensation of the three-phase current sensor, the sampled current $I_{correct}$ is expressed as:

$$I_{correct}(t) = I_{measure}\left(t - \theta_{comp}/(2\pi f)\right)/K_{comp}$$

where t is the sampling time, and $I_{measure}$ is the current actually sampled by the three-phase current sensor.

Obviously, the above-mentioned embodiment is only an example for clear explanation, and is not a limitation of the implementation. For ordinary technicians in the field, other changes or changes in different forms can be made on the basis of the above description. It is not necessary and impossible to exhaust all the embodiments here. However, obvious changes or changes derived therefrom are still within the scope of protection of the present disclosure.

What is claimed is:

1. A method for simultaneously realizing current sampling gain and delay compensation, comprising a calibration mode and a regulation mode executed in sequence, the calibration mode comprising: calculating and generating a first reference direct-axis and quadrature-axis currents and a first three-phase drive voltage in a synchronous rotating coordinate system based on a virtual angle of a given frequency and an amplitude and an angle of a given current command; driving a dummy load module by the first three-phase drive voltage to generate a first three-phase current; sampling and detecting the first three-phase current generated by the dummy load module in real time, generating and outputting feedback direct-axis and quadrature-axis current signals in the synchronous rotating coordinate system by a first three-phase current sensor, to form a first feedback for real-time adjustment; and extracting a d-axis control voltage $v_d$ as a calibrated d-axis voltage when in a stable state;

wherein the dummy load module comprises a three-phase symmetrical inductor with star connection; and the regulation mode comprising: calculating and generating a second reference direct-axis and quadrature-axis currents and a second three-phase drive voltage in the synchronous rotating coordinate system based on an actual virtual angle, and an amplitude and an angle of an actual current command; driving the dummy load module by the second three-phase drive voltage to generate a second three-phase current; sampling and detecting the second three-phase current generated by the dummy load module in real time, generating and outputting a feedback direct-axis and quadrature-axis current signal in the synchronous rotating coordinate system by a second three-phase current sensor to be compensated, to form a second feedback for real-time adjustment; and storing a current adjustment gain parameter $K_{comp}$ and a sampling delay compensation angle $\theta_{comp}$ to complete the current sampling gain and the delay compensation of the second three-phase current sensor to be compensated of a current when in a stable state.

2. The method according to claim 1, wherein obtaining the actual virtual angle $\theta_{eadj}$ and the amplitude $I_{sadj}$ of the actual current command through real-time feedback compensation by:

$$I_{sadj} = I_{scali} - I_{scomp}$$
$$\theta_{eadj} = \theta_e + \theta_{comp}$$

where $I_{scali}$ is the amplitude of the given current command, and $I_{scomp}$ is a current command amplitude compensation obtained based on a deviation between a calibrated voltage amplitude obtained in the calibration mode and a voltage amplitude calculated by a voltage detection and calculator in real time; and $\theta_e$ is the virtual angle of the given frequency, and $\theta_{comp}$ is a virtual angle compensation obtained based on a deviation between the calibrated d-axis voltage obtained in the calibration mode and a d-axis voltage detected by the voltage detection and calculator in real time.

3. The method according to claim 2, wherein calculating the calibrated voltage amplitude $u_{scali}$ by:

$$u_{scali} = \sqrt{v_d^2 + v_q^2}$$

where $v_d$ is a d-axis control voltage and $v_q$ is a q-axis voltage amplitude.

4. The method according to claim 2, wherein calculating the current adjustment gain parameter $K_{comp}$ by:

$$K_{comp} = \frac{I_{sadj}}{I_{scali}}$$

5. A system for simultaneously realizing current sampling gain and delay compensation, which is configured to implement the method for simultaneously realizing current sampling gain and delay compensation according to claim 1, comprising:

a current command generation module configured to calculate and generate the first reference direct-axis and quadrature-axis currents corresponding to the calibration mode and the second reference direct-axis and quadrature-axis currents corresponding to the regulation mode in a synchronous rotating coordinate system based on the amplitude and the angle of the given current command;

a virtual angle generation module configured to generate the virtual angle of the given frequency;

the dummy load module comprising the three-phase symmetrical inductor with star connection, wherein the three-phase symmetrical inductor is driven by the first three-phase drive voltage corresponding to the calibration mode and the second three-phase drive voltage corresponding to the regulation mode to generate the first three-phase current corresponding to the calibration mode and the second three-phase current corresponding to the regulation mode;

a current detection module comprising the first three-phase current sensor corresponding to the calibration mode and the second three-phase current sensor corresponding to the regulation mode, wherein the first three-phase current sensor corresponding to the calibration mode and the second three-phase current sensor corresponding to the regulation mode are configured to detect the first three-phase current corresponding to the calibration mode and the second three-phase current corresponding to the regulation mode generated by the dummy load module;

a three-phase drive voltage generation module configured to generate the first three-phase drive voltage corresponding to the calibration mode and the second three-phase drive voltage corresponding to the regulation mode; and a sampling delay and gain compensation module configured to store the current adjustment gain parameter $K_{comp}$ and the sampling delay compensation angle $\theta_{comp}$ to complete the sampling gain and delay compensation of the first three-phase current sensor corresponding to the calibration mode and the second three-phase current sensor corresponding to the regulation mode to be compensated of a current in a regulation mode.

6. The system according to claim 5, wherein the three-phase drive voltage generation module further comprises:

a voltage control module configured to detect a deviation between the reference direct-axis and quadrature-axis currents generated by the current command generation module and the feedback direct-axis and quadrature-axis current signals, and output the d-axis control voltage and a q-axis control voltage, respectively; and an inverter drive module configured to receive the d-axis control voltage and the q-axis control voltage output by the voltage control module and the virtual angle output by the virtual angle generation module to generate the three-phase drive voltage.

7. The system according to claim 6, wherein the voltage control module further comprises:

a q-axis voltage controller configured to detect a deviation between a q-axis reference current $i_{qref}$ generated by the current command generation module and a q-axis feedback current $i_q$ output by the current detection module, and output the q-axis control voltage $v_q$ through a q-axis voltage regulator; and a d-axis voltage controller configured to detect a deviation between a d-axis reference current $i_{dref}$ generated by the current command generation module and a d-axis feedback current $i_d$ output by the current detection module, and output the d-axis control voltage $v_d$ through a d-axis voltage regulator.

8. The system according to claim 6, wherein the inverter drive module further comprises:

an inverse Park converter configured to receive the d-axis control voltage $v_d$ and the q-axis control voltage $v_q$ output by the voltage control module, and the virtual angle $\theta_e$ output by the virtual angle generation module for inverse Park mathematical conversion to generate voltages $v_\alpha$ and $v_\beta$ in a two-phase stationary coordinate system;

a spatial vector pulse width modulation (SVPWM) modulator configured to receive the voltages $v_\alpha$ and $v_\beta$ in the two-phase stationary coordinate system for space vector pulse width modulation to generate an impulse wave; and an inverter configured to generate the three-phase drive voltage based on the impulse wave.

9. The system according to claim 6, wherein the sampling delay and gain compensation module further comprises:

a voltage detection and calculator configured to detect the d-axis control voltage and the q-axis control voltage output from the voltage control module in real time;

a current amplitude regulator configured to obtain a current command amplitude compensation based on a deviation between a calibrated voltage amplitude and a voltage amplitude calculated by the voltage detection and calculator in real time; and a delay compensation regulator configured to obtain a virtual angle compensation based on a deviation between the calibrated d-axis voltage and the d-axis control voltage detected by the voltage detection and calculator in real time.

10. The system according to claim 5, wherein the first three-phase current sensor corresponding to the calibration mode and the second three-phase current sensor corresponding to the regulation mode adopts a standard current sampling element in the calibration mode.

* * * * *